April 18, 1961 P. G. EMBRING 2,980,248
MEDICAMENT MOLD
Filed Oct. 28, 1957 2 Sheets-Sheet 2

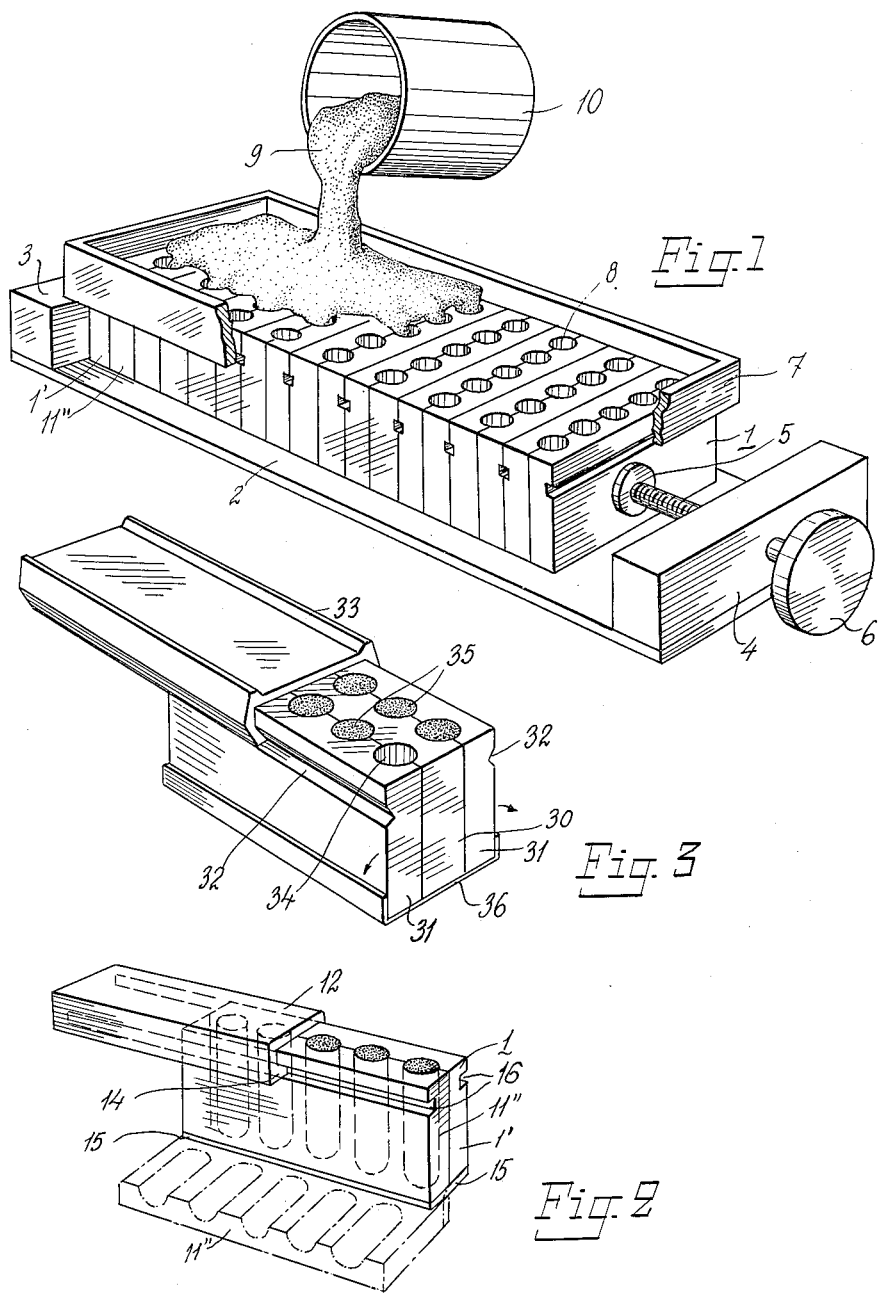

INVENTOR.
PAUL GUNNAR EMBRING
BY Parker & Philpitt
his attorneys

United States Patent Office 2,980,248
Patented Apr. 18, 1961

2,980,248

MEDICAMENT MOLD

Paul Gunnar Embring, Uppsala, Sweden, assignor to Aktiebolaget Akerlund & Rausing, Lund, Sweden, a company of Sweden Filed Oct. 28, 1957, Ser. No. 692,599

6 Claims. (Cl. 206—63.2)

This invention generally relates to a combined mold and commercial package, and more particularly it pertains to combined mold and commercial package for distributing molded medicaments, suppositories and the like. In one specific embodiment, this invention pertains to a commercial package for distributing molded medicaments, suppositories and the like, comprising in combination at least two separable elongated juxtaposed mold parts, the adjacent faces of which fit tightly and which are provided with a plurality of congruent pairs of vertical recesses which in pairs form mold cavities open at their tops, molded bodies in said mold cavities, a slidable cover fitting over the tops of the mold parts adapted to protect the upper ends of the molded bodies and having depending sides adapted to hold the mold parts tightly together, and a flexible band of plastic material across the bottoms of said mold parts forming a flexible hinge so that when said cover is removed the tops of the mold parts can be swung apart to open the mold and provide ready access to the molded bodies.

The application of various molding techniques in producing suppositories from fusible fats and in manufacturing pastilles from other types of solidifying substances is well known. The molding of suppositories in the form of cornets or capsules surrounded by a layer of thin paper or metal foil is also well known. In processes of this type a suitable portioning device feeds the solidifying substances into the cornets or capsules, one by one. The molding of suppositories one by one into cornets or capsules is of course not an economical method of manufacturing on a large scale.

The object of the present invention is to provide a more satisfactory solution to the problem of manufacturing and distributing moldable medicaments and the like in portions of predetermined size and form. One of the important elements of the present invention involves the use of the molds themselves as packages for the molded bodies, and it has been proved that molds that are well adapted for the molding of medicaments can now be made from such low cost materials (e.g. plastic) that it is economically practical simply to leave the molded bodies in the mold and to distribute the mold and molded article as a unit. In this manner the actual packaging procedure is greatly simplified, firstly because the single molded bodies each get a natural and fully satisfactory protection while in the mold and thus do not need to be individually wrapped in special protective coverings, and secondly, because the mold itself, being made of relatively stiff material, does not require any special, expensive or high strength boxes to protect it against the various forces encountered in normal transportation and handling operations.

In accordance with this invention, a number of mold units, each containing a plurality of mold cavities, are aligned in a row and simultaneously filled with the substance which is to be molded while the substance is in a liquid state, said mold units being of such a shape that when assembled for filling the outer longitudinal sides of the molds are in a tightly abutting relationship. The substance to be molded is permitted to initially form an excess layer above the level of the tops of the individual mold cavities, after which this excess layer is removed with the result that the molded portion within each mold cavity is thereby given a predetermined size and form. The molded bodies are left behind in the molds and the mold units are then provided with a lid or a similar means as a protection for the exposed parts of the molded bodies. In this manner a uniform filling of all mold cavities is assured, and after the removal of the excess layer, the single mold cavities will all contain a definite amount of substance so that the accurate portioning or dosage necessary (e.g. of medicaments) is obtained and at the same time a satisfactory and convenient package for distribution of the molded bodies is provided.

For the molding of the bodies, it is advantageous to employ separable or detachable molds consisting of two or more parts which are suitably connected to one another by a hinge or a hinge-like arrangement so that the medicaments can easily be taken out of the mold cavities by the consumer.

In a preferred embodiment the combined mold and package according to this invention is characterized in that it consists of two hinged mold halves which together form a mold unit provided with several individual mold cavities and which are so constructed that they can be held together by means of a lid covering the openings of the mold cavities. During the molding of the substance this lid is removed from the mold and the two halves of the mold are held together during the molding process in any suitable way, for example by means of clamps, after which the lid is put on, and labels if required, are applied directly to the sides or bottom of the mold unit, or the lid. Such a combined mold and package made, for example, of plastic, gives an excellent protection to the molded bodies during distribution and is usually more economical than the wrappings of paper or metal foil for the individual bodies and the packing boxes for said wrapped-up bodies that would otherwise be required to give the bodies the same protection. The considerable simplification in the working procedure also means that the ultimate cost to the consumer will be reduced.

Additional objects and advantages of this invention will become more apparent after reading the following description taken in conjunction with the drawings wherein:

Figure 1 is a perspective view of a plurality of mold units being filled with molding material;

Figure 2 is a perspective view showing a separate mold unit with the molded bodies therein and having a sliding lid thereon;

Figure 3 shows another embodiment of a mold forming unit containing two rows of molded bodies;

Figure 4:
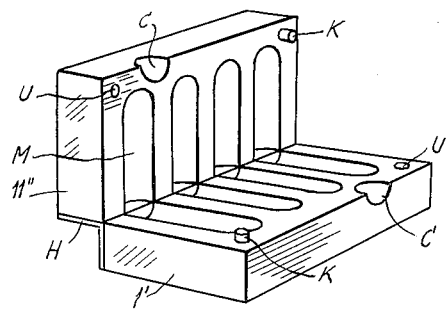
Figure 4 illustrates another embodiment of a mold forming unit having snap lock means.

Referring now to Figure 1, a number of mold units 1, each mold unit consisting of two substantially identical halves 1' and 11", are assembled on stand 2 in a side by side relationship in the form of a rectangular block. One end of the stand 2 contains a fixed block 3 and the other end of stand 2 contains a block 4 of similar shape and size. A clamp-screw 5 is screwed into and through block 4 and can be tightened by means of a wheel-knob 6 so as to press together the mold units 1 in a compact side by side relationship. An upper band 7 extends around the upper periphery of the mold units 1 so as to form an upperly projecting flange around the upper portion of the mold unit and thus serve as a pouring basin for the moldable material 9. The band 7 may consist of either a rubber paper or plastic ring. Each of the mold units 1 contains a plurality of individual mold cavities 8 (five cavities are shown in each mold unit of Figures 1 and 2) and each of the mold cavities is closed at its bottom and open at its top.

The substance 9 to be molded is poured directly on top of the aligned mold units in a melted or fluid state from any suitable pouring vessel 10 and is allowed to quickly spread in one layer over and into the mold cavity openings within the pouring basin formed by band 7. In this way an excess layer of the moldable substance 9 remains above the tops of the mold cavities when the molding procedure is finished. This excess layer of moldable substance 9 can be easily removed by scraping and in this way it is possible to insure that the amount of substance remaining in the mold cavity has a definite volume which in most cases implies a sufficiently accurate dispensing of the moldable substance.

The single mold units 1 may be provided with a suitable protection for the exposed substance at the top of the mold cavities 8 and this protection may merely consist of a strip of metal foil, greaseproof paper or the like. The mold units 1 are maintained in a closed position and are provided with a suitable cover, and an appropriate label and, if desired, a simple protective wrapper.

In the molding of suppositories it has proved extremely advantageous to employ mold units which consist of two substantially identical mold halves. The mold halves are preferably connected to one another at their lower portions by a hinge-like construction, the lower portion of the mold halves being that portion which is opposite the open end into which the substance to be molded is poured. The hinge-like constructions may be achieved in a number of ways. As shown in Figures 2 and 3, the hinge-like construction may simply consist of a flexible band or strip (15 in Figure 2, U-shaped band 36 in Figure 3), preferably made of adhesive tape or plastic but also possibly made of very thin sheet metal. Hinge-like constructions H of the flexible band type are also shown in Figures 4, 5, 6, 9 and 10.

Figure 8:
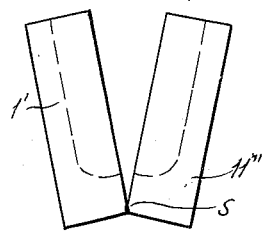

It is preferred that the mold halves be biased away from each other to at least some extent. When the mold halves are baised away from each other the mold halves spread apart so as to permit easy removal of the molded body. It is preferred that the mold halves be biased in such a fashion that when there is no lid or cover over the mold halves, the mold halves will automatically assume a divergent angle of between 5 and 90 degrees with respect to each other. The biasing of the mold halves may be achieved in a number of ways. When the mold is made from plastic material (such as polyethylene), sufficient biasing can sometimes be achieved by manufacturing the entire mold by injection molding in a single molding operation in such a manner that the lower portions of the mold halves remain joined together along a relatively narrow area or seam adjacent the lower inner portions of each mold half with the mold parts normally in slightly opened position, said narrow area or seam at the same time serving as a hinge connection between the mold halves. Figure 8 illustrates a mold unit of this sort which has been biased to the open position due to the action of a lower seam S joining mold halves 1' and 11" and also serving as a hinge connection. A hinge connection could also be achieved, if biasing were not a factor, by injection molding the entire mold unit and thereafter almost but not quite sawing the mold unit into two halves, the unsawn portion forming a bridge connection between the mold halves.

Figure 7:
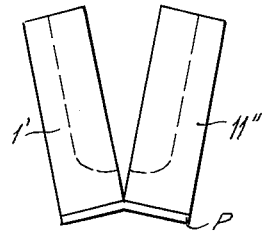
Figures 7–10 illustrate various embodiments of biasing means which may be used in accordance with this invention.

Figure 7 illustrates a mold unit which has been biased to the open position by means of a relatively thick plastic strip P. In this embodiment the plastic mold halves 1' and 11" can be manufactured as separate units and then heat sealed to the plastic strip P in the position shown.

Figure 9:
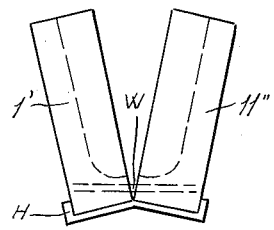
Figure 10:

Figures 9 and 10 illustrate still another means for biasing the mold halves apart. In Figure 9 a substantially horizontal hole is shown drilled through the two mold halves and this hole is adapted to receive a thin flexible wire or band W. When the mold halves are closed as is shown in Figure 10, the thin flexible wire or band W will be bent into a slight arc, so that the natural tendency of the wire W is to spread the mold halves apart to the position shown in Figure 9. Thus, although a simple lid or cover over the tops of the mold halves will serve to maintain the mold halves together, the mold halves will be automatically spread apart, as soon as the lid or cover is removed.

The biasing of the mold halves not only facilitates removal of the molded bodies but in addition helps to insure that the cover or lid over the top of the mold halves will not accidentally slide off.

Those skilled in the art will readily perceive that there are numerous other ways of biasing the mold halves apart so as to achieve the advantages noted.

As indicated above, the mold units of this invention are provided with a lid or cover means. One of the simplest types of such cover means is a sliding lid which has a generally U-shaped cross-section and which embraces and holds together the upper edges of mold halves 1' and 11". In addition to holding the mold halves together, the sliding lid protects the exposed surfaces of the molded bodies. Thus in Figure 2, the sliding lid 12 covers and protects the exposed surfaces of the molded bodies. As is illustrated with respect to Figure 2, at least one side of the sliding lid is preferably provided with inwardly projecting tongues 14, which are adapted to slide in corresponding grooves 16 on the outer faces of the mold halves, so that the lid 12 cannot accidentally come loose from the mold halves 1' and 11".

Figure 3 illustrates an embodiment of this invention wherein the molded bodies are arranged in two parallel rows. In this embodiment an intermediate section 30 and two identical outer sections 31 cooperate to form the two rows of mold cavities 34 when the groove-like cavities on the outer faces of intermediate section 30 are brought into abutting relationship with the groove-like cavities on the inner faces of outer sections 31. The outer faces of outer sections 31 contain grooves 32 so as to form a guide or trackway for the sliding lid 33, thus insuring that sections 30 and 31 will be kept together when closed. Sections 30 and 31 are connected to each other at their bottoms by an adhesive band or tape 36, or a similar flexible sheet material which may be connected to the bottom of each section. This construction permits the outer sections 31 to be swung downwardly to expose the suppositories 35 as soon as the lid 33 has been removed.

Figure 4 illustrates a modified embodiment of the mold wherein the mold halves 1' and 11" are fastened together at their open end by a hinge-like construction H and the other ends of the mold halves 1' and 11" are adapted to either be spread apart in the manner shown or closed and fastened together by a snap lock action resulting from the engagement of projecting knobs K and undercut holes U. Shallow incuts C in the mold halves permit one to spread the mold halves apart by inserting fingernails in the incuts. When the mold halves are spread apart the molded bodies within the mold cavities M may be easily removed.

Figure 5:
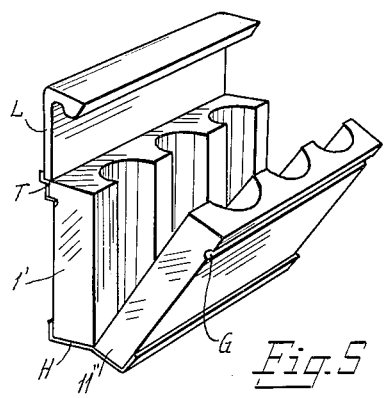
Figure 5 and 6 illustrate another embodiment of a mold forming unit in accordance with this invention.
Figure 6:
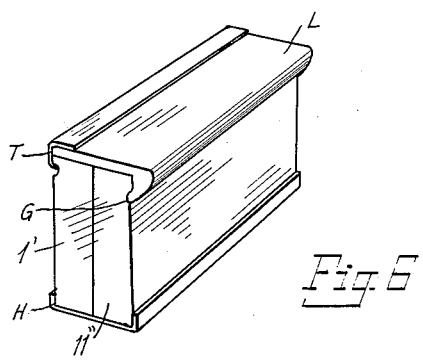

Figures 5 and 6 illustrate another embodiment in accordance with this invention. In this embodiment mold halves 1' and 11" are joined along their bottom surfaces by a hinge-like construction H. Mold half 1' has hinged thereto (e.g. by means of cellulose adhesive tape T) a snap down lid L. One edge of lid L is bent over so that when the lid is closed the bent over portion will engage a groove G located on the outer face of mold half 11″, thus passing and locking mold halves 1′ and 11″ together by a snap-lock action. Lid L can be simply disengaged from the mold halves and changed from the position shown in Figure 6 to the position shown in Figure 5 by merely pressing the outer edge of lid L upwardly with the fingers.

The novel mold and package units of this invention are preferably made of plastic or synthetic resin materials due to the ease with which such materials can be handled and molded. Polyethylene has been found to be a preferred plastic material, although phenol-formaldehyde, urea-formaldehyde or any other moldable plastic material may be employed.

The invention is, of course, not restricted to the various specific embodiments which have been shown and described as it will be obvious to those skilled in the art that a great number of equivalent arrangements are possible without departing from the scope of the invention.

This application is a continuation-in-part of my prior application, Serial No. 382,800, filed September 28, 1953.

What is claimed is:

1. In a mold unit adapted to receive and form moldable material into suppositories, medicaments and the like comprising a mold body having top and bottom surfaces and divided into at least two separable juxtaposed parts, the adjacent faces of said parts being formed with matching recesses each adapted to cooperate with the corresponding recess on the other juxtaposed part to form a mold cavity closed at one end and open to a surface of the mold body at the other, and wherein all of the mold cavities are arranged to open at the top surface of the mold body with their closed ends directed towards the bottom surface, and wherein there are means connecting together the mold parts adjacent said bottom surface for swinging movement between open and closed positions: the improvement which comprises means associated with the connection between said mold parts for biasing the parts to partly opened position, and a releasable cover member adjacent said top surface of the mold body serving to retain the mold body parts in closed position in opposition to said biasing means and serving simultaneously to overlie the open ends of said mold cavities to retain the moldable material therein.

2. A mold unit adapted to receive and form moldable material into suppositories, medicaments and the like comprising a mold body having top and bottom surfaces and divided into at least two separable juxtaposed parts, the adjacent surfaces of said parts being formed with matching recesses each adapted to cooperate with the corresponding recess on the other juxtaposed part to form a mold cavity closed at one end and open to a surface of the mold body at the other, and wherein all of the mold cavities are arranged to open at the top surface of the mold body with their closed ends directed towards the bottom surface, means consisting of a flexible, resilient bridge member for connecting together each pair of mold parts adjacent said bottom surface for swinging movement between open and closed positions and being constructed with an inherent bias in a direction to urge the mold parts away from each other towards opened position, said mold parts and bridge member being integrally formed of a single piece of resilient plastic material.

3. In a mold unit adapted to receive and form moldable material into suppositories, medicaments and the like comprising a mold body having top and bottom surfaces and divided into at least two separable juxtaposed parts, the adjacent faces of said parts being formed with matching recesses each adapted to cooperate with the corresponding recess on the other juxtaposed part to form a mold cavity closed at one end and open to a surface of the mold body at the other, and wherein all of the mold cavities are arranged to open at the top surface of the mold body with their closed ends directed towards the bottom surface, and wherein the mold parts are connected together adjacent said bottom surface for swinging movement between open and closed positions: the improvement which comprises a cover member having a relatively non-releasable hinged connection with one of the mold parts and a readily releasable snap action connection with another of the mold parts such that when the snap action connection is effected, the cover member acts to retain the mold parts in closed position, said cover member also including means to overlie said top surface and thereby close the open ends of the cavities whenever said cover is in said mold part retaining position, whereby said mold unit additionally serves as a storage and sales package and delivery means for the molded suppositories, medicaments or the like when required.

4. In a mold unit adapted to receive and form moldable material into suppositories, medicaments and the like comprising a mold body having top and bottom surfaces and divided into at least two separable juxtaposed parts, the adjacent faces of said parts being formed with matching recesses each adapted to cooperate with the corresponding recess on the other juxtaposed part to form a mold cavity closed at one end and open to a surface of the mold body at the other, and wherein all of the mold cavities are arranged to open at the top surface of the mold body with their closed ends directed towards the between surface, and wherein the mold parts are connected together adjacent one of said surfaces for swinging movement between open and closed positions: the improvement which comprises a flexible bridge member attached to said top surface and serving as the means for swingably connecting said mold parts adjacent said top surface and simultaneously acting as a cover member to overlie said top surface and thereby close the open ends of said cavities, and releasable interlocking means on said mold parts for normally retaining said mold parts in closed position at said bottom surface.

5. A mold unit adapted to receive and form moldable material into suppositories, medicaments and the like and to serve as a storage package and delivery means for the latter as required, comprising a mold body of resilient plastic material divided into at least two separable juxtaposed parts, the adjacent faces of said parts being formed with matching recesses each adapted to cooperate with the corresponding recess on the other juxtaposed part to form a mold cavity closed at one end and open to a surface of the mold body at the other, all of the mold cavities being arranged to open at one surface of the mold unit with their closed ends directed towards the opposite surface, the mold parts being connected together adjacent one of said surfaces for swinging movement to open position, and releasable interlocking snap means formed integrally with the resilient plastic material of said mold parts for normally retaining the same in closed position.

6. As a new article of manufacture and sale, a package of shaped articles of a moldable product comprising a mold body having top and bottom surfaces and divided into at least two separable juxtaposed parts, the adjacent faces of said parts being formed with matching recesses each adapted to cooperate with the corresponding recess on the other juxtaposed part to form a mold cavity closed at one end and open to a surface of the mold body at the other, and wherein all of the mold cavities are arranged to open at the top surface of the mold body with their closed ends directed towards the bottom surface, the mold parts being connected together adjacent said bottom surface for swinging movement between open and closed positions, means adjacent the connection between the mold parts for biasing the parts towards partly opened position, a releasable cover member adjacent said top surface of the mold body serving to retain the mold body parts in closed position in opposition to said biasing means and serving simultaneously to overlie the open ends of said mold cavities to retain the moldable product therein, and solidified increments of said product in molded relation to the walls of each of said cavities to form an article in each.

References Cited in the file of this patent

UNITED STATES PATENTS

| Number | Name | Date |
|---|---|---|
| 112,634 | Robbins | Mar. 14, 1871 |
| 170,975 | Wetmore | Dec. 14, 1875 |
| 371,176 | Coleman | Oct. 11, 1887 |
| 1,177,451 | Sheasley | Mar. 28, 1916 |
| 1,286,651 | Kendall | Dec. 3, 1918 |
| 1,379,109 | Kutner | May 24, 1921 |
| 1,776,888 | Clark | Sept. 30, 1930 |
| 2,091,603 | Lemire | Aug. 31, 1937 |
| 2,249,005 | Karns | July 15, 1941 |
| 2,366,886 | Van Tuyl | Jan. 9, 1945 |
| 2,390,945 | Kleinberg | Dec. 11, 1945 |
| 2,589,349 | Diefenbach | Mar. 18, 1952 |